March 30, 1965
R. G. FERRIS
3,175,829
TANDEM FLAIL TYPE MATERIAL UNLOADERS
Filed April 15, 1963
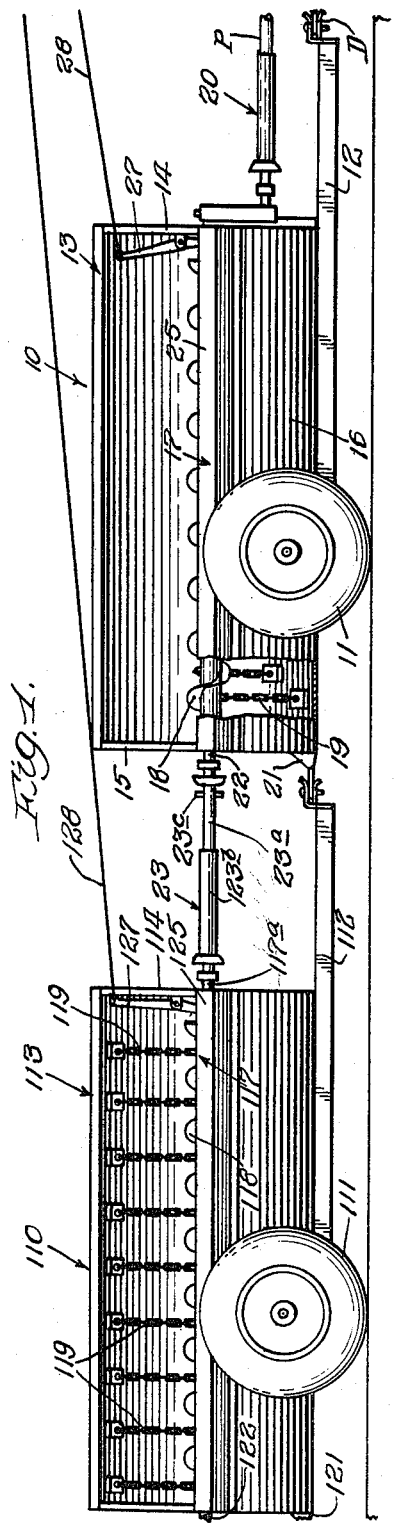
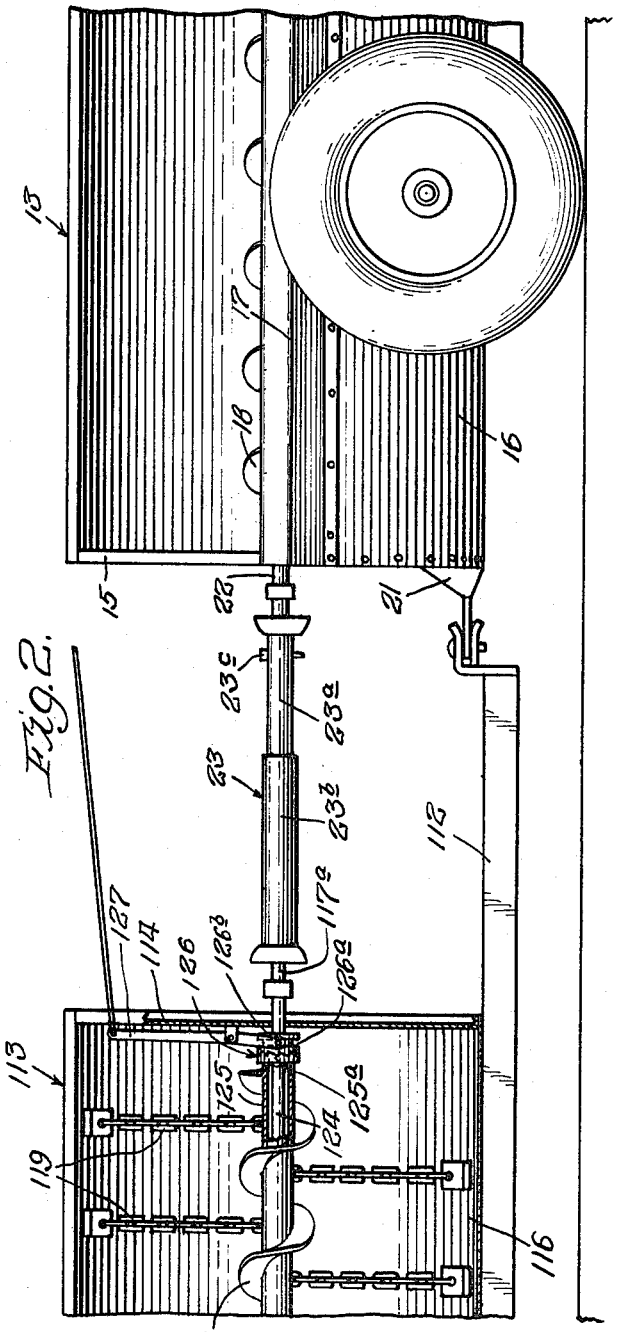
Inventor:
Robert G. Ferris,
By Hofgren, Wegner, Allen,
Stellman & McCord, Attys.

United States Patent Office 3,175,829
Patented Mar. 30, 1965

3,175,829
TANDEM FLAIL TYPE MATERIAL UNLOADERS
Robert G. Ferris, Harvard, Ill., assignor to Starline, Inc., a corporation of Illinois
Filed Apr. 15, 1963, Ser. No. 273,202
6 Claims. (Cl. 275—3)

This invention relates to flail type material unloaders, and in particular it relates to an arrangement for operating a group of such unloaders in tandem.

Material unloaders of the type disclosed in Elwick Patent 2,886,332 provide a very useful and efficient type of material unloader or spreader, for spreading litter of any type on farm fields or other areas. Nevertheless, such spreaders have one fundamental objection, which is the large starting load which is thrown upon a tractor power take-off by the need for drawing the flail members through the litter until the litter is removed from immediately around the unloader shaft which carries the flails. In fact, there is a rather high power requirement at all times because the effective operation of the spreader requires that the flails, on which there are large flail plates, be dragged through the litter to fling it from the container.

Accordingly, there are practical limits to the possible capacity of the containers which may be employed in a spreader or unloader of the Elwick type.

In accordance with the present invention, a plurality of Elwick type spreaders are so constructed that they may be drawn in tandem behind a prime mover, with the first spreader in the tandem arrangement selectively driven from the power take-off of the prime mover, and each succeeding spreader driven from the unloader shaft of the next preceding spreader with provision for driving the unloading flails of each spreader at will.

The foregoing arrangement permits the series of tandem spreaders to be operated by unloading any one spreader in the series while all the remaining spreaders are idle, and then driving the unloading flails of a second spreader so that the second spreader is unloaded, and so on until all of the spreaders in the tandem series have been unloaded.

The foregoing arrangement has several advantages. In the first place it effectively divides the load on the power take-off of the prime mover at all times during the unloading or spreading operation. In the second place it permits the use of two or more relatively small spreaders, so that the weight of the load upon the ground may be adequately divided over a wide area without the use of tandem wheels upon any one of the spreaders. Another advantage of the invention is that it affords a high degree of flexibility of operation, since a farmer may use a single spreader when this is adequate for his needs, but may put an extra spreader in operation when there is an unusually large amount of litter to be handled.

The present invention is particularly advantageous where it is necessary to dispose of a large volume of relatively light weight litter, such as pea vines, cabbage leaves, or other vegetable residues which make fine fertilizer if they are chopped and spread over a field. The Elwick type spreader can simultaneously chop and distribute such materials; and due to the relatively light weight of the material, a farm tractor may haul several relatively small spreaders which, in the aggregate, can carry a large volume of such material.

This invention also takes full advantage of the benefit afforded by the liquid tight container of the Elwick type spreader, which permits a loaded spreader to be hauled on a highway to carry the fertilizer to a distant field. The high capacity of a group of tandem spreaders makes such longer hauls of fertilizer more practical, since a single spreader load is sufficient to fertilize only a relatively small field.

There is, of course, a practical limit on the number of spreaders which may be operated in tandem, because in accordance with the invention, the unloader shafts of all the spreaders ahead of the unloading spreader continue to be driven, even though their unloading flails may not be driven, and accordingly, there is an ultimate cumulative frictional and inertia effect which limits the number of units which may be operated in tandem. Nevertheless, the power required to drive the unloader shaft when the flails are not actively removing material is obviously only a small fraction of the power required to carry on an unloading operation.

The invention is illustrated in a preferred embodiment in the accompanying drawings, in which:

FIG. 1 is a side elevational view of two spreaders in tandem, with the first spreader idle and the second spreader operating; and FIG. 2 is a fragmentary side elevation on an enlarged scale to better illustrate the selective driving connection for the unloading flails of the second of two similar spreaders.

In accordance with the drawings, a first spreader 10 and a second spreader 110 are of very similar construction, and corresponding parts will be given similar reference numerals with reference numerals for the second spreader one hundred higher than those for the first.

A wheeled carriage 11 is provided with a forwardly extending tongue 12 by means of which the spreader may be drawn from the drawbar D of a prime mover. A container, indicated generally at 13, includes front and rear walls 14 and 15, respectively, and a bottom wall 16 which extends approximately 270° around the container body. An unloader shaft assembly, indicated generally at 17, is journaled in the end walls 14 and 15 and is provided with helical starter means 18 as in Elwick Patent No. 3,048,409, and a plurality of flexible flails 19. Drive means, indicated generally at 20, permits the unloader shaft 17 to be rotated from the power take-off P of the prime mover. Secured to the rear wall 15 of the container is a coupler 21, to receive the tongue 112 of the second spreader 110, and the rear of unloader shaft 17 is provided with a power output extension 22 so that a forwardly projecting power input extension 117a on an unloader shaft assembly 117 of the spreader 110 may be connected with said output extension 22 by means of a drive coupler 23.

As seen in FIG. 2, the unloader shaft 117 of the second unloader includes an internal drive shaft 124, and a hollow flail shaft 125 journaled on the drive shaft at 125a may be selectively engaged with the drive shaft or released to idle thereon by means of a dog clutch 126, part 126a of which slides on a spline 126b. A control lever 127 pivoted on front container wall 114 permits the clutch to be engaged or disengaged from the prime mover by means of a pull cord 128 that extends through a hole in said front wall. The unloader shaft assembly 17 is identical with the assembly 117, and is illustrated in FIG. 1 with its lever 27 in position to disengage the clutch of the assembly 17, so that the first flail shaft 25 is idling.

The operation of the tandem spreaders heretofore described is believed to be obvious. With the spreaders 10 and 110 connected in tandem behind a prime mover the respective containers 13 and 113 are loaded with litter, and when the tandem spreaders have been moved to a field in which the material is to be spread, the power take-off P is engaged to drive the unloader shafts 17 and 117. The clutch of the shaft assembly 17 may be engaged, and the clutch 126 disengaged, so that only the first flail shaft 25 rotates. When the operator of the prime mover observes that discharge of material from the first spreader is becoming thin, he may engage the clutch 126 and continue to spread material with substantially all of the material coming from the second spreader 110. When container 10 is empty the clutch of shaft assembly 17 may be disengaged to relieve the power take-off of the load of driving the hollow shaft 25 and flails 18. If more than two spreaders are used the operation is repeated until all spreaders have been emptied of their litter.

Preferably the drive coupler 23 may be in the form of a slip connection having relatively telescoping parts 23a and 23b, and a removable pin 23c, so that by pulling the pin the unloader shaft assembly 117 may be completely disconnected while the first spreader 10 is unloading.

The foregoing detailed description is given for clearness of understanding only and no unnecessary limitations should be understood therefrom, as modifications will be obvious to those skilled in the art.

I claim:

1. Material spreading apparatus comprising: a plurality of spreader units each of which includes a wheeled carriage and a material container on the carriage, each container having front and rear end walls connected by a bottom wall; hitch means secured to the front of each unit substantially on the longitudinal median plane of the unit; a coupler secured to the rear of each unit substantially on the longitudinal median plane of the unit, the coupler of a first unit being engaged by the hitch means of a second unit so the units are connected in tandem; drive shaft means within each container and on the longitudinal median plane thereof, said drive shaft means being supported on and extending outwardly beyond both container end walls; means mounting a plurality of flexible flail members on the drive shaft means of each container so said flail members are rotatable with said drive shaft means; means on the front of the first carriage for pulling it behind a prime mover; means for driving the drive shaft means in the first container from a power source on the prime mover; shaft means providing the sole driving connection between the leading drive shaft and the next succeeding drive shaft, said shaft means being aligned with each said drive shaft means; and means for selectively breaking or making said driving connection, whereby said containers may be unloaded one at a time beginning with the first container by selectively breaking and making said driving connections.

2. The apparatus of claim 1 in which the driving connection between each drive shaft and the next succeeding drive shaft comprises a slip tube drivingly engaging the adjacent ends of both said shafts, and the means for selectively breaking or making the driving connection comprises means for selectively eliminating the transmission of rotary motion through the slip tube.

3. The apparatus of claim 2 in which the means for selectively eliminating transmission of rotary motion through the slip tube comprises a removable pin.

4. Material spreading apparatus comprising: a plurality of wheeled carriages; a material container on each carriage, each container having front and rear end walls connected by a bottom wall; means connecting said carriages to one another in tandem; drive shaft means within each container and on the longitudinal median plane thereof; said drive shaft means being supported on and extending outwardly beyond both container end walls; a tube journaled on each drive shaft means; a plurality of flexible flail members secured to each tube; clutch means acting between each tube and the shaft means on which it is journaled to selectively clutch and declutch the tube and the shaft; means on the front of the first carriage for pulling it behind a prime mover; means for driving the drive shaft means in the first container from a power source on the prime mover; means providing a driving connection between the rear of each drive shaft and the front of the next succeeding drive shaft; and remote control means for selectively clutching or declutching the tube and drive shaft means of each container from the prime mover, whereby said containers may be unloaded one at a time.

5. The apparatus of claim 4 in which each clutch means is positioned at the front of the flail supporting tube.

6. Material spreading apparatus comprising: a plurality of wheeled carriages; a material container on each carriage, each container having front and rear end walls connected by a bottom wall; means connecting said carriages to one another in tandem; drive shaft means within each container and on the longitudinal median plane thereof, said drive shaft means being supported on and extending outwardly beyond both container end walls; a tube journalled on each said drive shaft means; a plurality of flexible flail members on the tube of each container; means on the front of the first carriage for pulling it behind a prime mover; means for driving the drive shaft means in the first container from a power source on the prime mover; means providing a driving connection between the rear of each drive shaft and the front of the next succeeding drive shaft; and clutch means acting between each drive shaft means and the tube which is journalled thereon, said clutch means being engageable to rotate the tube and the flail members on the tube with the drive shaft means and being selectively disengageable so that the drive shaft means may rotate independently of the tube, whereby said containers may be unloaded one at a time beginning with the first container by selectively engaging and disengaging said clutch means.

References Cited by the Examiner

UNITED STATES PATENTS

| | | | |
|---|---|---|---|
| 1,245,168 | 11/17 | Wright | 56—6 X |
| 2,900,193 | 8/59 | Harriott | 275—3 |
| 2,925,201 | 2/60 | Peoples | 275—2 |
| 2,957,698 | 10/60 | Martens | 275—3 |
| 3,085,385 | 4/63 | Hansen et al. | 56—7 |

ABRAHAM G. STONE, *Primary Examiner.*

WILLIAM A. SMITH III, *Examiner.*